US005537864A

United States Patent [19]

Sood

[11] Patent Number: 5,537,864

[45] Date of Patent: Jul. 23, 1996

[54] APPARATUS AND METHOD FOR DETERMINING AND CONTROLLING COMBUSTOR PRIMARY ZONE TEMPERATURE

[75] Inventor: Virendra M. Sood, Encinita, Calif.

[73] Assignee: Solar Turbines Incorporated, San Diego, Calif.

[21] Appl. No.: 500,027

[22] Filed: Jul. 10, 1995

Related U.S. Application Data

[63] Continuation of Ser. No. 166,491, Dec. 10, 1993, abandoned.

[51] Int. Cl.[6] .......... G01L 3/26

[52] U.S. Cl. .......... 73/116; 60/39.27

[58] Field of Search .......... 60/39.27, 39.29; 73/116, 117.3

[56] References Cited

U.S. PATENT DOCUMENTS

| | | | |
|---|---|---|---|
| 3,377,848 | 4/1968 | Marvin | 73/117.3 |
| 3,719,071 | 3/1973 | Hohenberg | 73/116 |
| 3,899,878 | 8/1975 | Compton et al. | 60/39.28 T |
| 3,922,849 | 12/1975 | Kores et al. | 60/39.51 R |
| 4,184,083 | 1/1980 | Takeuchi | 290/40 C |
| 4,433,540 | 2/1984 | Cornelius et al. | 60/39.511 |
| 4,653,453 | 3/1987 | Kamai et al. | 123/494 |
| 5,080,065 | 1/1992 | Nomura et al. | 123/403 |
| 5,339,620 | 8/1994 | Ikeda et al. | 60/39.03 |
| 5,365,738 | 11/1994 | Etheridge | 60/742 |

*Primary Examiner*—Richard Chilcot
*Assistant Examiner*—Jewel V. Artis
*Attorney, Agent, or Firm*—Alan J. Hickman

[57] ABSTRACT

An apparatus and method for determining and maintaining the temperature of a primary zone of a combustor of a gas turbine engine at a predetermined level is provided. A first sensor senses the inlet air temperature of the combustor, a second sensor senses the inlet temperature of the turbine gases, and a third sensor senses the speed of or measures the load of the engine. Based on the first and second sensed temperatures, the speed or the load, and the preestablished combustor design parameter, the primary zone temperature of the combustor $T_{pz}$ is calculated. A controller maintains the combustor at a predetermined setpoint temperature by moving an air bleed valve between open and closed position, or a plurality of inlet guide vanes between open and closed positions.

20 Claims, 3 Drawing Sheets

APPARATUS AND METHOD FOR DETERMINING AND CONTROLLING COMBUSTOR PRIMARY ZONE TEMPERATURE

This application is a continuation of Ser. No. 08/166,491 filed on Dec. 10, 1993 and now abandoned.

TECHNICAL FIELD

This invention relates to an apparatus and method for determining and controlling the temperature of the combustion zone of a combustor of a gas turbine engine.

BACKGROUND ART

Increasingly strict emission limits are being imposed by regulatory agencies in the United States of America and several other industrialized countries on certain emissions (such as oxides of nitrogen and carbon monoxide) from gas turbine engines. This has resulted in the development of low emission combustion systems. One of the approaches to reducing these emissions utilizes the lean premix combustion concept. In this approach the fuel and air are uniformly premixed before they enter the combustion zone (primary zone) of a combustor and the fuel/air ratio is controlled so that there is a relative excess of air as compared to the stoichiometric fuel/air ratio. Oxides of nitrogen, carbon monoxide, and the like, hereinafter called emissions, from such a combustion system are primarily dependent upon the combustion air inlet temperature, fuel inlet temperature, fuel type, and the fuel/air ratio. It is, therefore, possible to control these emissions by controlling the fuel/air ratio of the combustion zone, the other variables being primarily dependent variables.

The optimum method of controlling emissions would be to control the fuel/air ratio of the combustion zone in response to the measured emissions and using an emissions signal in a feedback control loop to control the fuel/air ratio of the combustion zone. This however, is not practical using state of the art emission analyzers due to a slow response time, poor reliability, poor durability, and problems associated with zero drift and span drift requiring frequent calibration.

Since the emissions are principally dependent on the temperature of the combustion zone gases, it is possible to accurately control the emissions by controlling the temperature of the primary zone gases during engine operation. This requires that a signal proportional to the primary zone temperature be generated so that it can be used in a feedback control loop to regulate the primary zone temperature (through control of the parameters responsible for primary zone temperature such as fuel/air ratio, combustion air inlet temperature, relative humidity, and fuel composition).

Direct generation of a primary zone temperature signal using commonly available devices such as thermocouples, of any type, immersed in the combustion zone is highly unreliable due to their relatively short life at these high temperatures. Radiation pyrometer type sensing devices require optical access to the combustion zone gases and proper filtration of the optical signal in order to eliminate the radiation from the hot combustor surfaces and the hot carbon particles in the hydrocarbon fuel flames. Additionally, the emissivity of the combustion zone gases must be either directly measured or calculated from the known radiative properties of the combustion gases so that the temperature of the gases can be calculated to generate a signal proportional to the temperature of the combustion zone gases. Due to the errors in the calculation or measurement of the emissivity and the susceptibility of optical lenses or windows to fouling due to the lack of a continuous supply of high purity air, this approach also becomes highly impractical.

DISCLOSURE OF THE INVENTION

An apparatus for determining the temperature of a primary zone of a combustor of a gas turbine engine having a compressor portion and a turbine portion comprises a first sensor for sensing a first temperature at a first location between an outlet of the compressor portion and an inlet of the combustor and delivering a first signal in response to the sensed first temperature. A second means is provided for sensing a second temperature at a second location between an inlet and outlet of the turbine portion and delivering a responsive second signal. The apparatus further includes a third means for sensing either the speed of rotation of a rotatable member of the gas turbine engine or a load applied to a driveshaft of the gas turbine engine and delivering a responsive third signal. A processing device receives the first, second, and third signals, calculates the primary zone temperature of the combustor based on the first, second, and third signals and delivers a responsive signal based on the calculated primary zone temperature.

In another aspect of the present invention, an apparatus is provided for maintaining the temperature of a primary zone of a combustor of a gas turbine engine substantially at a predetermined constant temperature. A first sensor senses a first temperature at a first location between an outlet of the compressor portion and an inlet of the combustor and delivers a responsive first signal. A second sensor senses a second temperature at a second location between an inlet and outlet of the turbine portion and delivers a second signal responsive to the second sensed temperature. A third device is provided for sensing the speed of rotation of a rotatable member of the gas turbine engine or a load applied to a driveshaft of the gas turbine engine and delivers a responsive third signal. A processing means receives the first, second, and third signals, calculates the primary zone temperature of the combustor based on the received first, second, and third signals in accordance with the following equation:

$$T_{pz}=\frac{1}{\alpha}\left[\frac{T_5}{\beta}-(1-\alpha)T_2\right]$$

where:

$T_{pz}$=the primary zone temperature in °R.

α=the ratio of the primary zone air flow rate to the total combustor air flow rate.

$T_5$=the power turbine inlet temperature in °R.

$T_3$=the gas producer turbine rotor inlet temperature in °R.

β=the $T_5/T_3$ ratio established for the engine as a function of corrected $N_{gp}$ (for two shaft engines) or measured load (for single shaft engines).

and delivers a control signal based on the calculated primary zone temperature. A control means receives the control signal based on the calculated primary zone temperature, changes the rate of air flow delivered from the compressor to the combustor, and thereby maintains the temperature of the combustor primary zone within a predetermined range of values.

In yet another aspect of the present invention, a method for determining the temperature of a primary zone of a combustor of a gas turbine engine having a compressor portion and turbine portion comprises the steps of: sensing either the speed of rotation of a rotatable member of the gas turbine engine or the load applied to a driveshaft of the gas turbine engine; sensing a first temperature at a first location between an outlet of the compressor portion and inlet to the combustor; sensing a second temperature at a second location between an inlet and an outlet of the turbine; determining a temperature ratio (β) as a function of the third signal, the temperature ratio being based on measured ratios of second location temperatures relative to combustor exit temperatures at a plurality of measured third signals; determining an air flow ratio (α) based on a predetermined combustor primary zone air flow rate relative to a predetermined total combustor air flow rate; and estimating the primary zone temperature as a function of the first and second temperatures, either one of the speed of rotation of the rotatable member or the load applied to the output shaft, the temperature ratio (β), and the air flow ratio (α).

The method of accurately determining the primary zone temperature of a combustor of a gas turbine engine based on the sensing of the first and second temperatures (temperatures having a substantially lower magnitudes than the magnitude of the combustor primary zone temperature) makes it possible to accurately control the temperature of the primary zone of the combustor and therefore accurately control emissions.

The method for determining the temperature of the primary zone of a combustor is based on the $T_5/T_3$ ratio (β) for each value of the speed ($N_{gp}$) of rotation of a rotating member of the gas turbine engine or the load applied to the gas turbine engine. This ratio (β) is based on actual measured values of the instant engine as instrumented in a production test cell. This ratio (β) provides the basis for accuracy in the calculation of $T_{pz}$.

This invention synthesizes the estimation of primary zone temperature using the above-mentioned sensed parameters, the basic laws of thermodynamics, with some simplified assumptions, measured engine parameters, and available combustor design data to accurately calculate the combustor primary zone temperature.

Other advantages and objects of the present invention may be ascertained by a reading of the specification, drawings, and appended claims.

BEST MODE FOR CARRYING OUT THE INVENTION

Figure 1:
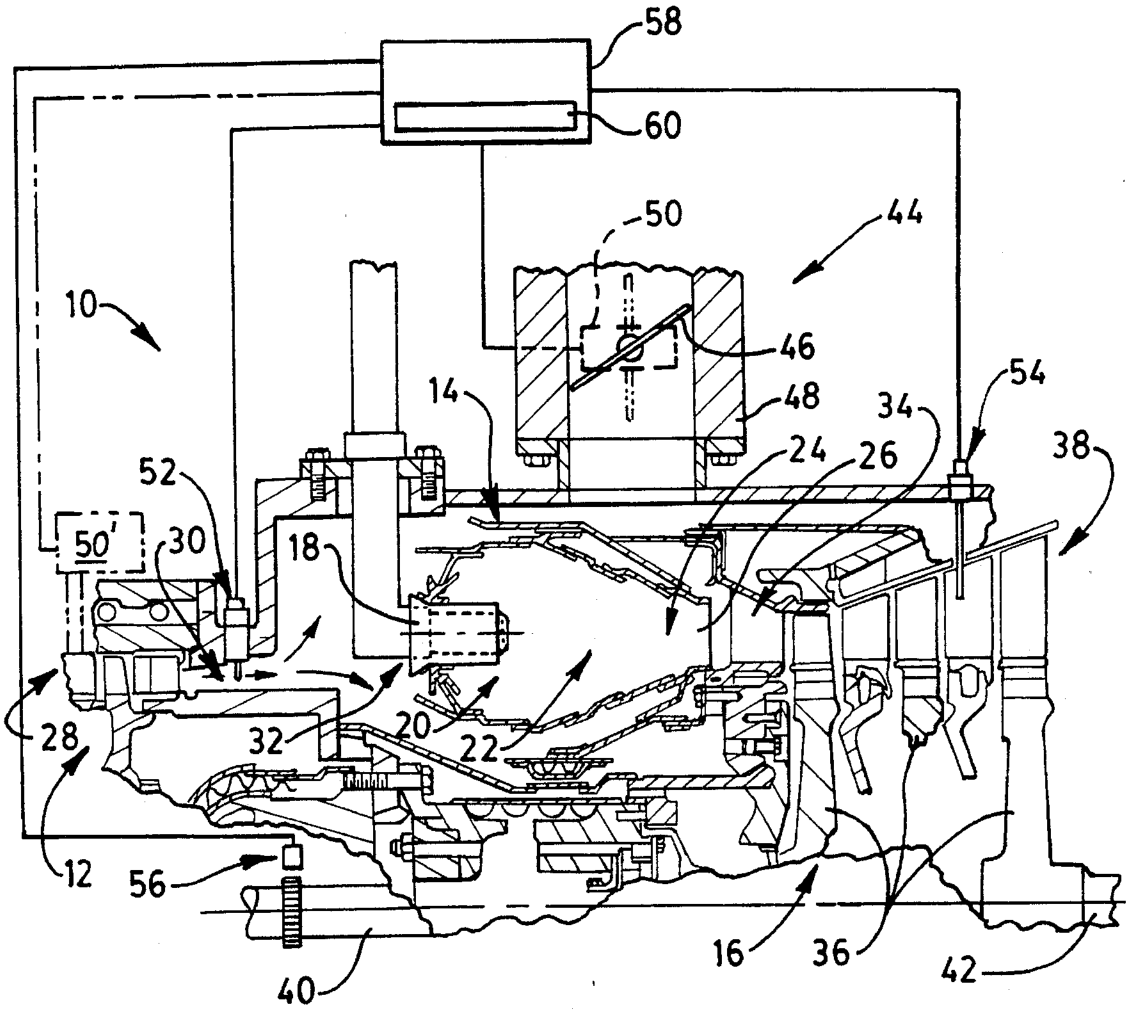
FIG. 1 is a diagrammatic schematic of an embodiment of the present invention showing a portion of the gas turbine engine in cross-section and the apparatus for determining and controlling the temperature of the primary zone of the combustor of the gas turbine engine.

With reference to the drawings and particularly FIG. 1, a portion of a gas turbine engine 10 is shown. The gas turbine engine 10 has a compressor portion 12, a combustor 14, and a turbine portion 16. The combustor portion 14 is located between the compressor portion 12 and the turbine portion 16.

A plurality of fuel injectors 18 (only one shown) are spaced circumferentially about the gas turbine engine 10 and connected to the combustor 14 at spaced locations. The combustor 14 is of the annular type. The fuel injectors 18 dispense premixed fuel and air to the combustor 14 for ignition by an ignitor (not shown). The combustion takes place in a primary zone 20 of the combustor and the reacted gases pass through a secondary zone 22, and a dilution zone 24, and exit the combustor 14 at an outlet 26.

The compressor portion 12 is shown as, but not limited to, an axial compressor of conventional design having one or more bladed compressor wheels and a plurality of inlet guide vanes 28 which are controllably moveable for varying the amount of inlet air flow to the compressor portion 12. Pressurized air flow produced in the compressor passes through an outlet 30 of the compressor portion 12 to an inlet 32 of the combustor 14.

The compressed air and fuel are mixed and ignited in the combustor. The reacted gases exiting the combustor enter an inlet 34 of the turbine portion 16. The reacted gases cause the bladed turbine wheels 36 to rotate. The gases exit the turbine portion 16 at an outlet 38 of the turbine portion 16.

The specific gas turbine engine shown is a two-shaft engine having both gasifier and power turbines. The gasifier turbine drives the compressor through rotatable shaft 40. The power turbine is connected to a driveshaft 42 which is ultimately connected to a load such as a generator, pump, drivetrain, and the like (not shown). It is to be noted that a single shaft engine may be utilized in place of the two-shaft engine without departing from the spirit of the invention.

The gas turbine engine 10 has an air bleed valve 44 which is connected to the engine and opens into the engine 10 at a location between the compressor outlet 30 and turbine inlet 34. The air bleed valve has a butterfly 46 which is pivotally connected to a housing 48 of the valve 44 and moveable between a first position at which at least a portion of the air flow directed from the compressor portion 12 to the combustor 14 is purged and a second position at which the air flow from the compressor portion 12 is directed towards the combustor 14. A control means 50 moves the air bleed valve between the first and second positions by pivotally moving the butterfly 46 between open and closed positions relative to the housing 48. It should be noted that other types of air bleed valves 44 such as gate valves, spool valves and the like would be suitable substitutes and considered with equivalence.

The control means 50 includes either a linear or rotary actuator. The actuators may be electrical or fluid operated motors of any suitable well-known construction. The actuators are connected to the butterfly 46. The control means 50 includes logic means for pivoting the butterfly 46 towards the open or closed positions and thereby varies the amount of air flow purged from the combustor 14. The control means 50 responds to signals from a controller 58 and causes the linear or rotary actuator to move the butterfly 46 towards the open and closed positions based on the signal received. The control means 50 includes either electro-hydraulic valves connected to the actuator or an electric motor control circuit connected to the electric motor. Such control means 50 are well known in the field and will not be elaborated on in any greater detail.

In a single shaft engine, the air bleed valve 44 is replaced by a plurality of variable inlet guide vanes 28. A control means 50', very similar in construction to control means 50, varies the pitch of the inlet guide vanes 28. Control of the position of the inlet guide vanes 28 is achieved in a similar manner as that of the air bleed valve 44. Specifically, the control means 50' includes rotary or linear actuators of either the fluid or electrically operated type. The actuators are connected to the inlet guide vanes 28 via any suitable linkage arrangement. The control means 50' controls either the delivery of electrical energy or fluid flow to the actuators and thereby controls pivotal movement of the inlet guide vanes 28. The control means 50' includes logic means for pivoting the guide vanes 28 towards the open or closed positions and thereby varies the amount of air flow entering the compressor portion 12. The control means 50' responds to signals from controller 58. Such control means 50' are well known in the field and will not be elaborated on in any greater detail.

A first means 52 senses a first temperature at a first location between an outlet of the compressor portion 30 and inlet of the combustor 32 and delivers a responsive first signal. The first means 52, as shown in FIG. 1, includes any one of a plurality of commercially available sensors capable of withstanding temperatures in the range of 500 to 900 degrees F. For example, the first means 52 includes a thermocouple or a radiation pyrometer type sensing device.

A second means 54 is provided for sensing a second temperature at a second location between the inlet 34 and outlet 38 of the turbine portion 16 and delivers a responsive second signal. The second means 54 includes a temperature sensor capable of withstanding a temperature range of between 1000 and 1500 degrees F. For example, the first means 54 includes a thermocouple or a radiation pyrometer type sensing device. It should be noted that the first means 52 senses combustor inlet air temperature ($T_2$) and the second sensor means 54 senses power turbine inlet gas temperature ($T_5$) in the two-shaft gas turbine engine embodiment shown.

A third means 56 is provided for sensing the speed of rotation of a rotatable member 40 of a two-shaft gas turbine engine and delivering a responsive third signal. Any suitable conventional speed sensor of the magnetic, or optical type may be used. The third signal provides an indication of speed in order that certain speed dependent parameters may be established. Further discussion related to speed sensing will follow.

In a single-shaft engine, the third means senses the load applied to the shaft 40 or 42 of the gas turbine engine and delivers a responsive third signal which is representative of a load applied to the engine such as by an electrical generator driven by the driveshaft 42. The load signal is normally available from an electric generator control system. Thus, no additional devices are necessary. In other non-generator applications, a gas producer speed measurement provides the load signal necessary for subsequent control.

A controller 58, including a processing means 60, is connected to the first, second and third sensing means 52, 54, 56. The controller 58 receives the first, second and third signals, calculates the temperature of the primary zone 20 of the combustor 14 based on the first, second and third signals, and a preestablished combustor design parameter ($\alpha$) delivers a responsive signal. Depending on the engine type, e.g., single or two-shaft engine, the responsive signal would be received by the control means 50, 50' and either the bleed valve 44 or inlet guide vanes 28 would be controlled to provide the desired end results, to maintain the temperature of the primary zone 20 at a preselected range of temperatures.

Figure 2:
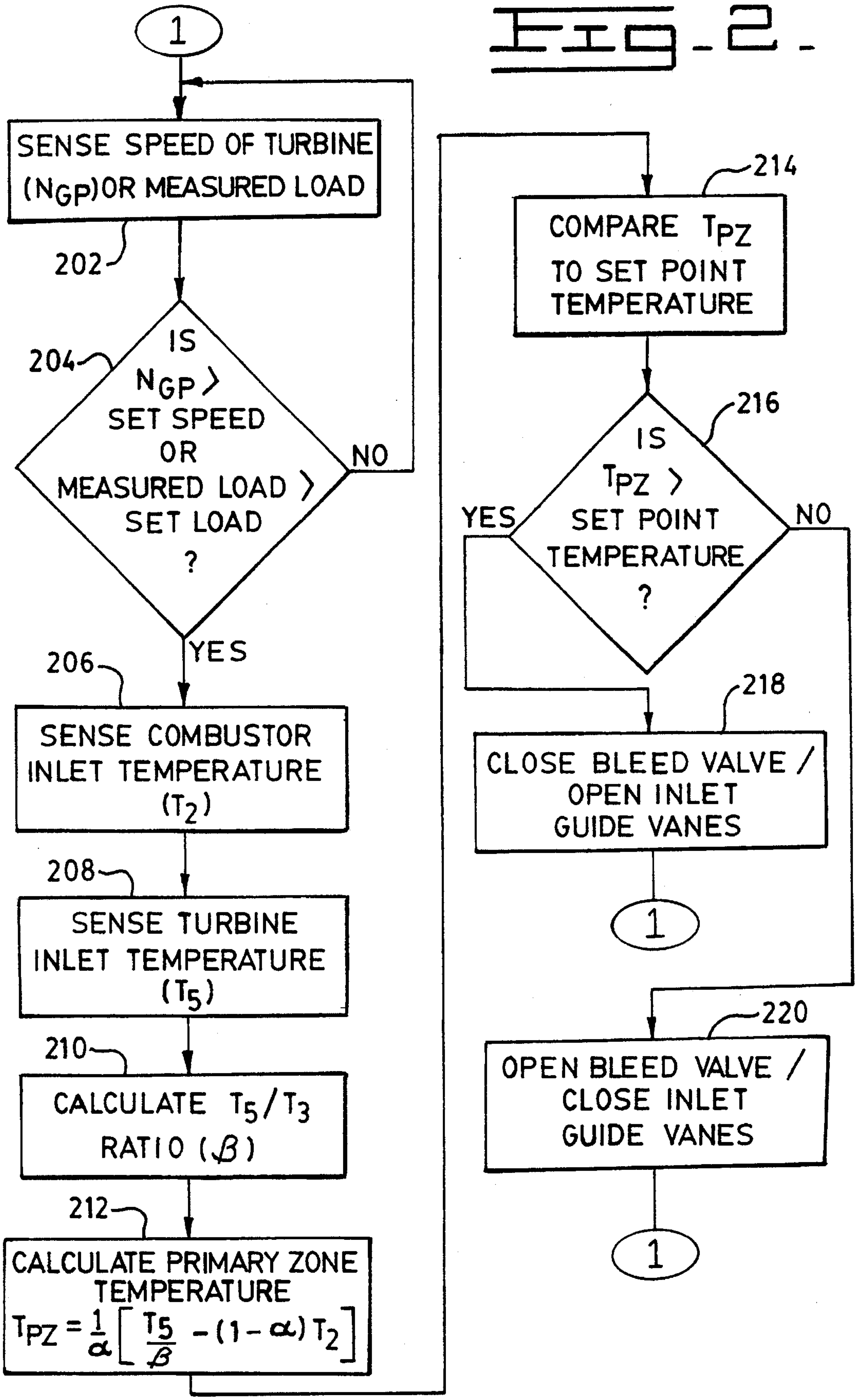
FIG. 2 is a flow chart showing the steps involved in processing the sensed parameters and controlling the primary zone temperature of the combustor of the gas turbine engine.

Referring to FIG. 2. The logic associated with controlling the primary zone temperature 20 of the gas turbine engine 10 is based on the theory that gas turbine combustors 14 use lean premixed combustion to control emissions such as oxides of nitrogen. In this type of combustion, the fuel and excess air are premixed prior to entering the primary combustion zone 20 inside the combustor 14. Due to the uniform mixing of fuel and air, the resulting potential temperature in the primary combustion zone is relatively low when compared to conventional combustion systems and is uniform. Therefore, there is only a narrow range of fuel air ratios over which the primary combustion zone 20 can operate stably without flameout. Consequently, if the gas turbine engine load is reduced, the decrease in the combustion zone fuel to air ratio tends to extinguish the flame in the primary combustion zone 20. To overcome this problem, on two-shaft gas turbines, when operating at part load conditions, a part of the compressed air at the compressor outlet 30 is dumped overboard through the air bleed valve 44. Dumping of the air overboard allows the engine to operate, at part load, at nearly the same primary combustion zone temperature as at design load, thus avoiding flameout and allowing the oxides of nitrogen (which are temperature dependent), from the combustion zone to be controlled.

As indicated earlier, in the case of a single-shaft engine, the problem of falling primary combustion zone temperature with decrease in load can be overcome by closing the compressor inlet guide vanes 28. By regulating the position of the inlet guide vanes, the emissions at any load can be controlled through the control of pressurized air flow directed to the primary zone of the combustor 14 and thereby control primary zone temperature.

The method, as set forth in FIG. 2, of controlling the gas turbine engine 10 to maintain the temperature of the combustor primary zone 20 at the predetermined temperature is carried out by the controller 58 and particularly the processing means 60. It should be noted that the processing means may include a microprocessor or a logic circuit of discrete electronic components arranged in a particular manner to deliver signals based on the input signals from the first, second, and third means 52, 54, 56.

As indicated in block 202, the speed ($N_{gp}$) of the rotatable shaft 40 of the gas turbine engine 10 is sensed (on a two-shaft engine) or the load applied to the driveshaft 42 is measured (on a single-shaft engine). Upon completion of this step, the sensed speed ($N_{gp}$) is compared to a set speed or the measured load is compared to a set load. As shown in block 204, if the speed is greater than the set speed or the measured load is greater than the set load, the step of block 206 is executed. Conversely, if the sensed speed is less than a set speed or the measured load is less than a set load, the step of block 202 is reexecuted. The principle underlying the executed steps in block 204 is that at set speed or set load and above, the engine is fully operational and the temperature of the primary zone 20 of the combustor is controllable by varying the air bleed valve 44 or inlet guide vane 28 positions.

Figure 3:
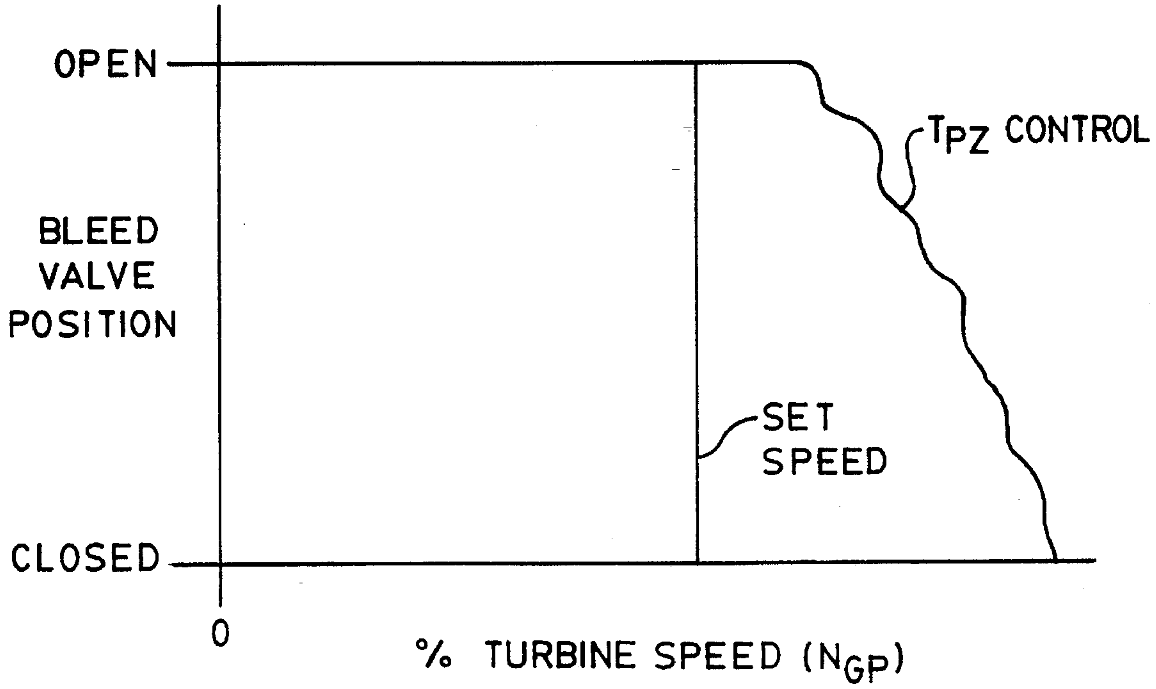
FIG. 3 is a graph showing primary zone temperature control as a function of turbine speed and air bleed valve position.

As shown in FIG. 3, turbine speed ($N_{gp}$) is charted against air bleed valve position 44. At the set speed and above, the combustor 14 primary zone temperature $T_{pz}$ is regulated by the controller 58. The graph of FIG. 3 shows the air bleed valve 44 open at speeds below set speed and closed at the upper speed limit. At speeds below set speed the engine 10 is operating in a conventional manner and at speeds above set speed the engine is operating under Tpz control of controller 58. It should be recognized that a similar graph could be easily generated for inlet guide vane 28 position relative to engine load. In order to maintain the temperature of the primary zone 20 of the combustor at a predetermined value or within a narrow range of temperature values, it is necessary to be able to accurately predict the primary zone temperature by sensing certain temperature parameters. The temperature parameters selected are those which can be sensed accurately and reliably and without degradation over a period of time. It has been determined that (block 206) the temperature between the compressor outlet 30 and the combustor inlet 32 be sensed. Preferably, combustor inlet temperature $T_2$ is sensed.

In block 208, the temperature at the second location, between the inlet and outlet of the turbine portion 34, 38 is sensed. Preferably, power turbine inlet temperature $T_5$ is sensed.

In order to determine the combustor primary zone temperature, it is necessary to measure the ratio of temperature at the second location relative to the temperature at the turbine inlet location 34 for each different value of the third signal. This ratio of power turbine inlet temperature $T_s$ to the turbine inlet temperature $T_3$ is known as β. β is engine dependent and determined during initial testing of the gas turbine engine 10. Therefore, for each value of $T_5$ there is a corresponding value of $T_3$. This ratio for various different engine speeds is measured during a production engine test and retained in any suitable form, such as a $T_5/T_3$ curve, $T_5/T_3$ table or raw data. Once β is determined for relevant engine speeds or loads, it is possible to calculate the primary zone temperature.

With reference to box 212, the primary zone temperature is calculated in accordance with the following equation:

$$T_{pz}=\frac{1}{\alpha}\left[\frac{T_5}{\beta}-(1-\alpha)T_2\right]$$

where:

$T_{pz}$=the primary zone temperature °R.

α=the ratio of the primary zone air flow rate to the total combustor air flow rate.

$T_5$=the power turbine inlet temperature °R.

$T_3$=the gas producer turbine rotor inlet temperature °R.

β=the $T_5/T_3$ ratio established for the engine as a function of $N_{gp}$ (for two shaft engines) or measured load (for single shaft engines).

The value of α is fixed by the design of the fuel injectors, the combustor, the liner, and associated componentry. Therefore, for each sensed value of $T_5$ and $T_2$ (blocks 206 and 208), the primary zone temperature $T_{pz}$ is calculated. As indicated in block 214, the calculated $T_{pz}$ is compared to a setpoint primary zone temperature established for the particular engine model as shown in block 216. If $T_{pz}$ is greater than the setpoint temperature, the controller 58 delivers a signal to either the control means 50 of the bleed valve 44 or the control means 50' of the inlet guide vanes 28. The air bleed valve 44 responsively moves towards the second position or the inlet guide vanes 28 responsively move towards the open position in order to reduce the primary zone 20 temperature. Should the calculated primary zone temperature $T_{pz}$ be less than the primary zone setpoint temperature, the controller 58 signals the control means 50 to move the bleed valve 44 towards the first, open position, and control means 50' to move the inlet guide vanes 28 in a direction towards the closed position, as shown in block 220. Irrespective of the direction of movement of the air bleed valve 44 or the inlet guide vanes 28, the control means 58 stops movement of the valve 44 or vanes 28 when the calculated temperature is at set point temperature. Upon completion of steps 218 and 220, the logic sequence of blocks 202–220 are executed.

INDUSTRIAL APPLICABILITY

With reference to the drawings and in operation, once the gas turbine engine 10 reaches the predetermined set speed or set load, the air bleed valve 44 or inlet guide vanes 28 are modulated to maintain the primary zone 20 of the combustor at the set-point temperature or within a narrow set range of temperatures. Based on the $T_{pz}$ calculation and signals from the first and second sensing means 52, 54, it is possible to maintain primary zone temperature at the set range over the long haul as the first and second means 52, 54 are sensing lower value temperatures which are accurately measurable with state of the art probes. The controller 58 receives signals from the first, second and third means, 52, 54, 56, processes the received signals in accordance with the steps set forth in FIG. 2 and delivers signals to the control means 50, 50' to vary the position of the butterfly 46 of the air bleed valve 44 or the variable position of the inlet guide vanes 28 so as to change the amount of air purged from the combustor 14 or the amount of air delivered to the combustor 14. By maintaining the temperature at the predetermined setpoint (or narrow set range), the potential for combustor flameout is reduced, and the combustor can operate stably without flameout, even when the fuel air mixture rapidly approaches its lean blowout limit as load is reduced.

Thus, the method and apparatus for determining and maintaining the primary zone temperature of a combustor 14 at a predetermined value (or narrow range of values) can prevent a clean burning lean fuel mixture engine from flameout at reduced load levels. As a result reduced emissions, particularly oxides of nitrogen, can be maintained.

Other aspects, objects and advantages of the present invention can be obtained from a study of the drawings, the disclosure and the appended claims.

What is claimed is:

1. An apparatus for maintaining a temperature of a primary zone of a combustor of a gas turbine engine substantially at a predetermined constant temperature, said gas turbine engine having a compressor portion and a turbine portion, said compressor portion being adapted to deliver compressed air flow to said combustor, comprising:

first means for sensing a first temperature at a first location of the gas turbine engine between an outlet of the compressor portion and an inlet of the combustor portion and delivering a responsive first signal;

second means for sensing a second temperature at a second location of the gas turbine engine between an inlet and an outlet of the turbine portion and delivering a responsive second signal;

third means for sensing a speed of rotation of a rotatable member of the gas turbine engine and delivering a responsive third signal;

processing means for receiving said first, second, and third signals, calculating a primary zone temperature of the combustor based on the received first, second, and third signals, and delivering a responsive control signal;

control means for receiving said control signal, changing the rate of air flow delivered from the compressor to the combustor, and maintaining the temperature of the combustor primary zone within a predetermined range of temperature values at which the exhaust emitted from the gas turbine engine is at a preselected acceptable emissions level, said control means including an air bleed valve connected to said gas turbine engine at a location adjacent said combustor and being adapted to purge a portion of the air flow delivered from the compressor to the combustor.

2. An apparatus, as set forth in claim 1, wherein said combustor primary zone temperature being determined as a function of a predetermined measured ratio of a temperature at the second location relative to a temperature at an exit location of the combustor for each different value of the third signal.

3. An apparatus, as set forth in claim 2, wherein said combustor primary zone temperature being determined as a function of a predetermined air flow ratio, said air flow ratio being a ratio of the combustor primary zone air flow rate relative to total air flow rate of the combustor.

4. An apparatus, as set forth in claim 1, wherein said primary zone temperature being determined in accordance with the following equation:

$$T_{pz}=\frac{1}{\alpha}\left[\frac{T_5}{\beta}-(1-\alpha)T_2\right]$$

where:

$T_{pz}$=the primary zone temperature in °R

α=the ratio of the primary zone air flow to the total combustor air flow rate $T_5$=the power turbine inlet temperature in °R $T_3$=the gas producer turbine rotor inlet temperature in °R β=the $T_5/T_3$ ratio established for the engine as a function of corrected $N_{gp}$.

5. An apparatus, as set forth in claim 1, wherein said first means being positioned to sense the combustor inlet temperature.

6. An apparatus, as set forth in claim 1, wherein said second means being positioned to sense the power turbine inlet temperature.

7. An apparatus, as set forth in claim 1, wherein said air bleed valve being movable between a first position at which at least portion of the air flow directed form the compressor portion the combustor is purged and a second position at which the air flow from the compressor portion is directed toward the combustor, said air bleed valve being movable between said first and second positions in response to said control means receiving said signal.

8. An apparatus, as set forth in claim 7, including moving the air bleed valve toward said first position in response to said control means receiving a signal indicating that the calculated primary zone temperature is less than a predetermined set value.

9. An apparatus, as set forth in claim 7, wherein said control means stopping movement of the air bleed valve in response to the calculated primary zone temperature being at said predetermined set value.

10. An apparatus, as set forth in claim 1, wherein said processing means comparing the speed of rotation of the rotating member of the gas turbine engine to a respective predetermined value and stopping the delivery of the control signal in response to said speed of rotation of the rotatable member being less than said respective predetermined value.

11. A method for determining a temperature of a primary zone of a combustor of a gas turbine engine having a compressor portion and a turbine portion and controlling the rate of air flow delivered from the compressor portion to the combustor to maintain the temperature of the combustor primary zone within a predetermined range of temperature values, comprising the steps of:

sensing a speed of rotation of a rotatable member of the gas turbine engine;

sensing a first temperature at a first location between an outlet of the compressor portion and an inlet to the combustor;

sensing a second temperature at a second location between an inlet and an outlet of the turbine;

determining a temperature ratio (β) as a function of the third signal, said temperature ratio being based on measured ratios of second location temperatures relative to combustor exit temperatures at a plurality of measured third signals;

determining an air flow ratio (α) based on a predetermined combustor primary zone air flow rate relative to a predetermined total combustor air flow rate;

calculating the primary zone temperature as a function of the first and second temperatures, the speed of rotation of the rotatable member, the temperature ratio (β), and the air flow ratio (α); and changing the rate of air flow delivered from the compressor to the combustor by purging a portion of the air flow delivered to the combustor and thereby maintaining the temperature of the combustor primary zone within a predetermined range of temperature values at which the exhaust emissions from the gas turbine engine is at a preselected acceptable emissions level.

12. A method, as set forth in claim 11, including the step of discontinuing the primary zone temperature calculation in response to one of the speed of rotation of the rotating member being at a magnitude less than a respective predetermined value.

13. A method, as set forth in claim 11, wherein the step of calculating the primary zone temperature is in accordance with the following equation:

$$T_{pz}=\frac{1}{\alpha}\left[\frac{T_5}{\beta}-(1-\alpha)T_2\right]$$

where:

$T_{pz}$=the primary zone temperature in °R.

α=the ratio of the primary zone air flow rate to the total combustor air flow rate $T_5$=the power turbine inlet temperature in °R.

$T_3$=the gas producer turbine rotor inlet temperature in °R.

β=the $T_5/T_3$ ratio established for the engine as a function of corrected $N_{gp}$.

14. An apparatus for maintaining a temperature of a primary zone of a combustor of a gas turbine engine substantially at a predetermined constant temperature, said gas turbine engine having a compressor portion and a turbine portion, said compressor portion being adapted to deliver compressed air flow to said combustor, comprising:

first means for sensing a first temperature at a first location of the gas turbine engine between an outlet of the compressor portion and an inlet of the combustor portion and delivering a responsive first signal;

second means for sensing a second temperature at a second location of the gas turbine engine between an inlet and an outlet of the turbine portion and delivering a responsive second signal;

third means for sensing a load applied to a drive shaft of the gas turbine engine and delivering a responsive third signal;

processing means for receiving said first, second, and third signals, calculating a primary zone temperature of the combustor based on the received first, second, and third signals, and delivering a responsive control signal;

control means for receiving said control signal, changing the rate of air flow delivered from the compressor to the combustor, and maintaining the temperature of the combustor primary zone within a predetermined range of temperature values at which the exhaust emitted from the gas turbine engine is at a preselected acceptable emissions level, said control means including a plurality of movable inlet guide vanes connected said gas turbine engine at an inlet to said compressor and movable to change the rate of air flow delivered to said compressor and thereby change the rate of air flow delivered to the combustor.

15. An apparatus, as set forth in claim 14, wherein said combustor primary zone temperature being determined as a function of a predetermined measured ratio of a temperature at the second location relative to a temperature at an exit location of the combustor for each different value of the third signal.

16. An apparatus, as set forth in claim 15, wherein said combustor primary zone temperature being determined as a function of a predetermined air flow ratio, said air flow ratio being a ratio of the combustor primary zone air flow rate relative to total air flow rate of the combustor.

17. An apparatus, as set forth in claim 14, wherein said primary zone temperature being determined in accordance with the following equation:

$$T_{pz}=\frac{1}{\alpha}\left[\frac{T_5}{\beta}-(1-\alpha)T_2\right]$$

where:

$T_{pz}$=the primary zone temperature in °R.

$\alpha$=the ratio of the primary zone air flow to the total combustor air flow rate.

$T_5$=the power turbine inlet temperature in °R.

$T_3$=the gas producer turbine rotor inlet temperature in °R.

$\beta$=the $T_5/T_3$ ratio established for the engine as a function of measured load.

18. An apparatus, as set forth in claim 14, wherein said first means being positioned to sense the combustor inlet temperature.

19. An apparatus, as set forth in claim 14, wherein said second means being positioned to sense the power turbine inlet temperature.

20. An apparatus, as set forth in claim 14, wherein said processing means comparing the load applied to the output shaft of the gas turbine engine to a respective predetermined value and stopping the delivery of the control signal in response to said load applied to the drive shaft being less than said respective predetermined value.

* * * * *